(12) United States Patent
Sakai et al.

(10) Patent No.: US 11,187,915 B2
(45) Date of Patent: Nov. 30, 2021

(54) PARALLEL LIGHT GENERATION DEVICE

(71) Applicant: MITSUBISHI ELECTRIC CORPORATION, Tokyo (JP)

(72) Inventors: Kohei Sakai, Tokyo (JP); Yukari Takada, Tokyo (JP); Fumio Shohda, Tokyo (JP); Kenichi Hirosawa, Tokyo (JP); Shumpei Kameyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/959,987

(22) PCT Filed: Jan. 10, 2018

(86) PCT No.: PCT/JP2018/000363
§ 371 (c)(1),
(2) Date: Jul. 2, 2020

(87) PCT Pub. No.: WO2019/138476
PCT Pub. Date: Jul. 18, 2019

(65) Prior Publication Data
US 2021/0063761 A1 Mar. 4, 2021

(51) Int. Cl.
*G02B 27/30* (2006.01)
*G02B 3/08* (2006.01)

(52) U.S. Cl.
CPC ............. *G02B 27/30* (2013.01); *G02B 3/08* (2013.01)

(58) Field of Classification Search
CPC ...... G02B 27/30; G02B 3/08; G02B 19/0057; G02B 27/0966; G02B 27/0916; G02B 27/0922; G02B 19/0052; G02B 3/06
(Continued)

(56) References Cited

U.S. PATENT DOCUMENTS

| 5,020,888 A | 6/1991 | Ishibai et al. |
| 11,061,244 B2 * | 7/2021 | Sakai ............. G02B 27/30 |

(Continued)

FOREIGN PATENT DOCUMENTS

| CN | 103176225 A | 6/2013 |
| CN | 106054396 A | 10/2016 |

(Continued)

OTHER PUBLICATIONS

Anthony E. Siegman, "LASERS", University Science Books, Mill Valley, California, 1986, total of 18 pages.

(Continued)

*Primary Examiner* — James C. Jones
(74) *Attorney, Agent, or Firm* — Birch, Stewart, Kolasch & Birch, LLP (57) ABSTRACT

In a plane perpendicular to the optical axis (10) of a lens (2), the direction in which the cylindrical surface has zero curvature is the direction of generatrix of the lens (2), and the direction in which the cylindrical surface has non-zero curvature and that is orthogonal to the direction of generatrix is the direction of curvature of the lens (2). A light source (1) is disposed at the focal position (21) in the direction of generatrix on the side of the incident surface (3) of the lens (2), and emits light toward the incident surface (3) of the lens (2), the light having a difference between the divergence angle in the direction of generatrix of the lens (2) and the divergence angle in the direction of curvature of the lens (2).

11 Claims, 6 Drawing Sheets

(58) Field of Classification Search
USPC .......................................................... 359/641
See application file for complete search history.

(56) References Cited

U.S. PATENT DOCUMENTS

2002/0003670 A1    1/2002  Oliva
2019/0391407 A1   12/2019  Sakai et al.

FOREIGN PATENT DOCUMENTS

| EP | 1 001 297 A1 | 5/2000 |
| JP | 2-235010 A | 9/1990 |
| JP | 7-318854 A | 12/1995 |
| JP | 2725198 B2 | 3/1998 |
| JP | 6165366 B1 | 7/2017 |

OTHER PUBLICATIONS

Machine translation of CN-106054396-A, published on Oct. 26, 2016.
Extended European Search Report for European Application No. 18899799.3, dated Dec. 4, 2020.
Chinese Office Action and Search Report for Chinese Appfication No. 201880085185.7, dated Aug. 5, 2021, with English translation.

\* cited by examiner

PARALLEL LIGHT GENERATION DEVICE

TECHNICAL FIELD

The present invention relates to a parallel light generation device including a lens that converts light entering from an incident surface into parallel light, and emits the parallel light from an exit surface.

BACKGROUND ART

In recent years, light sources capable of high-efficiency illumination have attracted attention, and light sources such as solid-state lighting using light emitting diodes (LEDs) or lasers have been produced.

Light emitted from a light source spreads while propagating. Therefore, to efficiently transmit light emitted from a light source to an optical system in a subsequent stage or a surface to be illuminated, the divergence angle of the light emitted from the light source is required to be reduced so that the light emitted from the light source can be converted into approximately parallel light.

For example, Patent Literature 1 listed below discloses a parallel light generation device that converts light emitted from a light source into parallel light.

In this parallel light generation device, an aspherical single lens is used as a lens for collimating light, and a light source that emits light with a large divergence angle is disposed at a focal position on an incident surface side of the lens so that the light emitted from the light source is converted into parallel light.

CITATION LIST

Patent Literature

Patent Literature 1: JP H02-235010 A (JP 1990-235010 A)

SUMMARY OF INVENTION

Technical Problem

A conventional parallel light generation device is formed as described above. Therefore, to reduce the divergence angle of light emitted from a lens, it is required for a distance between the light source and the lens to be large by designing the focal length of the lens to be sufficiently large. Further, as the distance between the light source and the lens is large, it is necessary to use a lens having a large effective aperture to efficiently use the energy of light emitted from the light source.

Therefore, for using a lens which emits light whose divergence angle is small, the size of the parallel light generation device is required to be large, and if a small size parallel light generation device is intended to be used, the divergence angle of light emitted from the lens cannot be small, which is a problem to be solved.

In the description below, the above problem will be explained specifically.

A light source included in a conventional parallel light generation device is not a point light source but a light source having a light emitting point of a certain size.

Where $w_h$ represents the light-emission half width of the light source in the horizontal direction, and $w_v$ represents the light-emission half width of the light source in the vertical direction, and f represents the focal length of the lens, the horizontal divergence half angle $\theta_{ho}$ of light collimated by the lens, and the vertical divergence half angle $\theta_{vo}$ of the light collimated by the lens are represented by Expression (1) shown below. The vertical direction is a direction orthogonal to the horizontal direction.

$$\theta_{ho} = \mathrm{Tan}^{-1}\left(\frac{w_h}{f}\right) \quad (1)$$

$$\theta_{vo} = \mathrm{Tan}^{-1}\left(\frac{w_v}{f}\right)$$

Accordingly, in a case where light emitted from a light source is collimated with a lens having a focal length f, the horizontal divergence half angle $\theta_{ho}$ and the vertical divergence half angle $\theta_{vo}$ after collimation increase with increase in the horizontal light-emission half width $w_h$ and the vertical light-emission half width $w_v$ of the light source.

Normally, a user cannot change the light emission width of a light source as desired. Therefore, to reduce the divergence angle, it is necessary to increase the focal length f of the lens. Since the light source is disposed at the focal position on the incident surface side of the lens, the distance between the light source and the lens increases with increase in the focal length f.

Here, a light source having a divergence angle $\theta_{hi} \times 2$ in the horizontal direction and a divergence angle $\theta_{vi} \times 2$ in the vertical direction which are different from each other is assumed to be used.

In a case where the divergence half angle $\theta_{vi}$ in the vertical direction is larger than the divergence half angle $\theta_{hi}$ in the horizontal direction, the light-emission half width $w_{v1}$ of a light beam on the incident surface of the lens is represented by following Expression (2).

$$w_{v1} = w_v + f \times \mathrm{Tan}(\theta_{vi}) \quad (2)$$

In a case where a lens having a focal length f is used, a lens having an effective aperture Φ that is directly proportional to the focal length f is required. As the focal length f is increased, a lens having a greater effective aperture Φ is required.

In a case where a lens having a focal length f is used, the effective aperture Φ of the lens is preferably $2 \times w_{v1}$ or greater so that the energy within the divergence half angle $\theta_{vi}$ is efficiently utilized.

In a case where the effective aperture Φ of the lens is smaller than $2 \times w_{v1}$, a part of the energy within the divergence half angle $\theta_{vi}$ is lost due to vignetting, resulting in inefficient use of the energy within the divergence half angle $\theta_{vi}$.

As for a lens having a thickness that satisfies the sine condition, the expression for calculating the light-emission half width $w_{v1}$ changes. Specifically, $f \times \mathrm{Tan}(\theta_{vi})$ in Expression (2) is replaced with $f \times \mathrm{Sin}(\theta_{vi})$. However, there is still a relationship among the focal length f, the divergence half angle $\theta_{vi}$, and the light-emission half width $w_{v1}$.

From the relationships shown in Expressions (1) and (2), for a light source having a horizontal light-emission half width $w_h$ and a vertical light-emission half width $w_v$, the focal length f, the effective aperture Φ ($\geq 2 \times w_{v1}$) of the lens, and the horizontal divergence half angle $\theta_{ho}$ and the vertical divergence half angle $\theta_{vo}$ after collimation cannot be independently determined, and they have a trade-off relationship.

In other words, to reduce the divergence half angles $\theta_{ho}$ and $\theta_{vo}$ after collimation, it is necessary to increase the focal length f to increase the distance between the lens having a large effective aperture Φ and the light source. If a lens having a small focal length f is used, it is not possible to reduce the divergence half angles $\theta_{ho}$ and $\theta_{vo}$. For this reason, it is difficult to achieve miniaturization of parallel light generation devices, smaller divergence angles, and high light use efficiency all at the same time.

The present invention has been made to solve the above problems, and an object thereof is to provide a parallel light generation device that does not need to use a lens that has a larger focal length and a greater effective aperture to reduce divergence angles.

Solution to Problem

A parallel light generation device according to the present invention includes: a light source to emit light; and a lens to convert light emitted from the light source and entered from an incident surface of the lens into parallel light and to emit the parallel light from an exit surface of the lens, the incident surface being a convex surface, the exit surface being a cylindrical surface. In a plane perpendicular to an optical axis of the lens, a direction in which the cylindrical surface has zero curvature is a direction of generatrix of the lens, and a direction in which the cylindrical surface has non-zero curvature and that is orthogonal to the direction of generatrix is a direction of curvature of the lens. The light source is disposed at a focal position in the direction of generatrix on a side of the incident surface of the lens, and emits light toward the incident surface of the lens, the light having a difference between a divergence angle in the direction of generatrix of the lens and a divergence angle in the direction of curvature of the lens.

Advantageous Effects of Invention

According to the present invention, in a plane perpendicular to an optical axis of the lens, a direction in which the cylindrical surface has zero curvature is a direction of generatrix of the lens, and a direction in which the cylindrical surface has non-zero curvature and that is orthogonal to the direction of generatrix is a direction of curvature of the lens. The light source is disposed at a focal position in the direction of generatrix on a side of the incident surface of the lens, and emits light toward the incident surface of the lens, the light having a difference between a divergence angle in the direction of generatrix of the lens and a divergence angle in the direction of curvature of the lens. Accordingly, there is an effect to obtain a parallel light generation device that does not need to use a lens that has a larger focal length and has a larger effective aperture to reduce divergence angles.

DESCRIPTION OF EMBODIMENTS

To explain the present invention in greater detail, some embodiments for carrying out the invention are described below with reference to the accompanying drawings.

First Embodiment

Figure 1A:
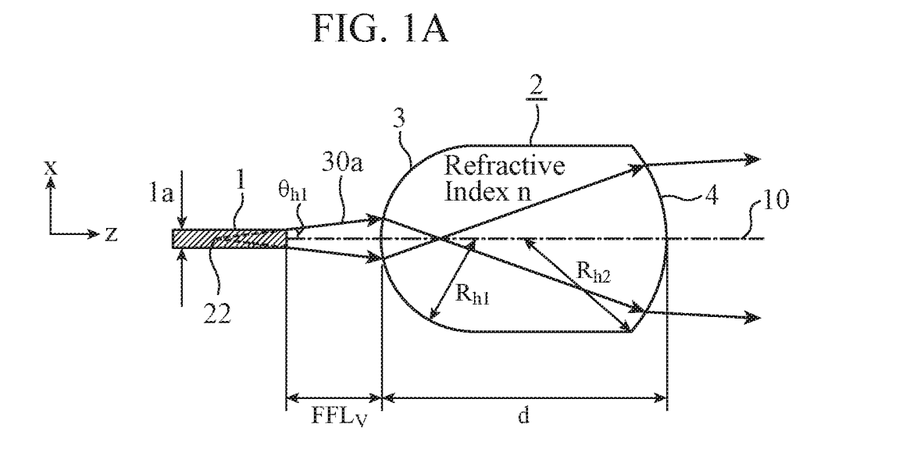
FIG. 1A is a plan view of a parallel light generation device according to a first embodiment.
Figure 1B:
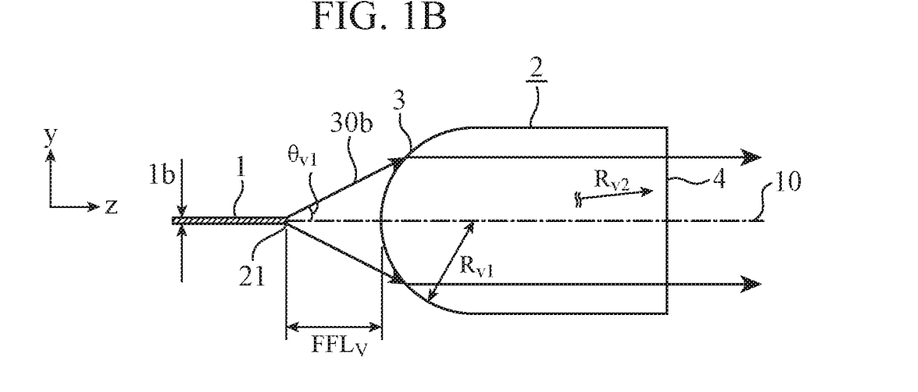
FIG. 1B is a side view of the parallel light generation device according to the first embodiment.

FIG. 1 includes configuration diagrams showing a parallel light generation device according to a first embodiment.

FIG. 1A is a plan view of the parallel light generation device according to the first embodiment. FIG. 1B is a side view of the parallel light generation device according to the first embodiment.

Figure 2A:
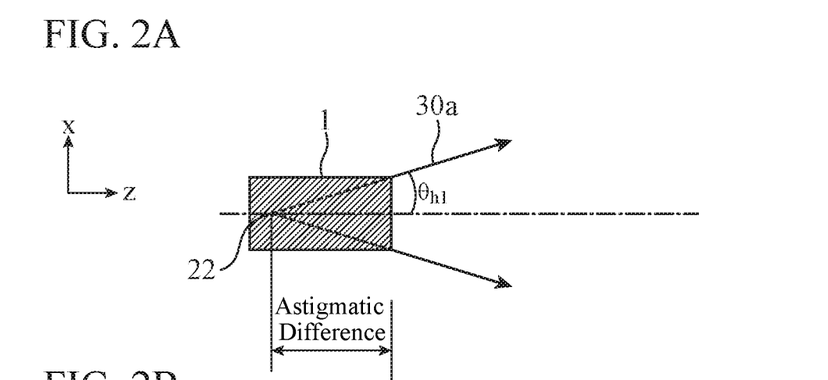
FIG. 2A is a plan view of a light source 1 of the parallel light generation device according to the first embodiment.
Figure 2B:
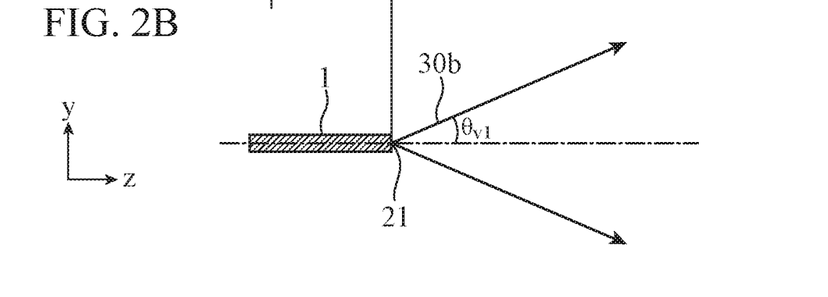
FIG. 2B is a side view of the light source 1 of the parallel light generation device according to the first embodiment.

FIG. 2 includes configuration diagrams showing a light source 1 of the parallel light generation device according to the first embodiment.

FIG. 2A is a plan view of the light source 1 of the parallel light generation device according to the first embodiment. FIG. 1B is a side view of the light source 1 of the parallel light generation device according to the first embodiment.

In FIGS. 1 and 2, the z direction is the optical axis direction of the parallel light generation device.

The x direction is the horizontal direction of the parallel light generation device orthogonal to the optical axis direction, and the y direction is the vertical direction of the parallel light generation device orthogonal to both the optical axis direction and the x direction.

The light source 1 emits light toward a lens 2.

The lens 2 is an optical element that has a convex surface as an incident surface 3 through which light emitted from the light source 1 enters the lens 2 and a cylindrical surface as an exit surface 4 from which light entered through the incident surface 3 exits, converts the light entered through the incident surface 3 into parallel light, and emits the parallel light from the exit surface 4.

The parallel light obtained by the conversion in the lens 2 is not necessarily exactly parallel light, and almost parallel light is also considered as the parallel light.

In a plane perpendicular to the optical axis 10 of the lens 2, the direction in which the cylindrical surface as the exit surface 4 has zero curvature is the direction of generatrix of the lens 2, and the direction in which the cylindrical surface has non-zero curvature and that is orthogonal to the direction of generatrix is the direction of curvature of the lens 2.

FIG. 1A shows the direction of curvature of the lens 2 in which the exit surface 4 has non-zero curvature, while FIG. 1B shows the direction of generatrix of the lens 2 in which the exit surface 4 has zero curvature.

In the first embodiment, the position of the end face of the light source 1 coincides with a focal position 21 in the direction of generatrix on the side of the incident surface 3 of the lens 2, as shown in FIG. 1B.

The light source 1 emits, toward the incident surface 3 of the lens 2, light whose divergence angle in the direction of generatrix of the lens 2 differs from its divergence angle in the direction of curvature of the lens 2.

The first embodiment is an example in which the divergence angle in the direction of generatrix shown in FIG. 1B is wider than the divergence angle in the direction of curvature shown in FIG. 1A.

In FIGS. 1A and 2A, the reference numeral 30a indicates a light beam in the direction of curvature of the lens 2 among light beams emitted from the light source 1.

In FIGS. 1B and 2B, the reference numeral 30b indicates a light beam in the direction of generatrix of the lens 2 among light beams emitted from the light source 1.

In the light source 1, the light emission width 1a in the x direction corresponding to the direction of curvature of the lens 2 is greater than the light emission width 1b in the y direction corresponding to the direction of generatrix of the lens 2.

A position 22 in the light source 1 is a virtual point of light emission in the x direction corresponding to the direction of curvature of the lens 2.

The focal position 21 is the position of the end face of the light source 1, and the position of the end face of the light source 1 is the point of light emission in the y direction corresponding to the direction of generatrix of the lens 2.

Accordingly, as shown in FIG. 2, the light source 1 has an astigmatic difference between the virtual point of light emission in the x direction and the point of light emission in the y direction.

In the first embodiment, an example in which a semiconductor laser is used as the light source 1 is described.

The divergence half angle $\theta_{h1}$ of the light beam 30a shown in FIGS. 1A and 2A is the minimum divergence half angle of light emitted from the light source 1, and is an angle between 2° and 15°, for example.

The divergence half angle $\theta_{v1}$ of the light beam 30b shown in FIGS. 1B and 2B is the maximum divergence half angle of light emitted from the light source 1, and is an angle between 15° and 45°, for example.

The light emission width 1a in the x direction of the light source 1 is in the range between a few µm and a few hundreds of µm, and the light emission width 1b in the y direction of the light source 1 is in the range between 1 µm and a few µm.

As shown in FIGS. 2A and 2B, the semiconductor laser serving as the light source 1 has an astigmatic difference of about a few µm to 20 µm, and the virtual point of light emission in the x direction is different from the point of light emission in the y direction. Therefore, light in the x-z plane emitted from the light source 1 is emitted from the position 22, which is on the inner side of the position of the end face of the light source 1.

The lens 2 is an optical element that has the incident surface 3 and the exit surface 4, and has a center thickness d, and is formed with glass having a refractive index n.

The lens 2 can be manufactured by a general method for manufacturing a lens, such as polishing, molding, and etching.

Although not shown in the lens 2 in FIG. 1, an antireflective film that prevents reflection of light emitted from the light source 1 may be formed on each of the incident surface 3 and the exit surface 4 of the lens 2. Further, a light amount monitor or the like may be prepared so that light reflected by the respective surfaces of the incident surface 3 and the exit surface 4 is used.

The incident surface 3 of the lens 2 is a convex surface that is axially symmetrical about the optical axis 10, and the exit surface 4 of the lens 2 is a cylindrical surface.

The cylindrical surface, which is the exit surface 4, has a direction that has non-zero curvature in a plane perpendicular to the optical axis 10 of the lens 2 as shown in FIG. 1A, and a direction that has zero curvature in the plane as shown in FIG. 1B.

The cylindrical surface is a convex surface in the direction having curvature as shown in FIG. 1A, and is a flat surface in the direction having zero curvature as shown in FIG. 1B.

The incident surface 3 of the lens 2 has a curvature radius $R_{h1}$ in the x-z plane, and a curvature radius $R_{v1}$ in the y-z plane.

The exit surface 4 of the lens 2 has a curvature radius $R_{h2}$ in the x-z plane, and a curvature radius $R_{v2}$ in the y-z plane.

In this first embodiment, the incident surface 3 is a convex surface that is axially symmetrical about the optical axis 10, and accordingly, $R_{h1}=R_{v1}$.

Further, in this first embodiment, the cylindrical surface that is the exit surface 4 is a flat surface in the y-z plane, and accordingly, $R_{v2}=\infty$.

The light beam 30a in the direction of curvature of the lens 2 satisfies the relationship among the curvature radius $R_{h1}$ in the x-z plane on the incident surface 3 of the lens 2, the curvature radius $R_{h2}$ in the x-z plane on the exit surface 4 of the lens, the center thickness d of the lens 2, and the refractive index n of the lens 2, represented by following Expression (3).

$$R_{h1} - R_{h2} + \frac{n-1}{n}d = 0 \qquad (3)$$

In Expression (3), the sign of the curvature radius $R_{h1}$ is positive when the center of curvature of the incident surface 3 is located on the side of the light source 1, and is negative when the center of curvature of the incident surface 3 is located on the side opposite to the light source 1, with respect to the point of intersection between the incident surface 3 and the optical axis 10.

In the example shown in FIG. 1, the incident surface 3 is a convex surface, and the center of curvature of the incident surface 3 is located on the side opposite to the light source 1 with respect to the point of intersection between the incident surface 3 and the optical axis 10. Accordingly, the sign of the curvature radius $R_{h1}$ is negative. If the incident surface 3 is a concave surface, the center of curvature of the incident surface 3 is located on the side of the light source 1, and accordingly, the sign of the curvature radius $R_{h1}$ is positive.

The sign of the curvature radius $R_{h2}$ is positive when the center of curvature of the exit surface 4 is located on the side of the light source 1, and is negative when the center of curvature is located on the side opposite to the light source 1, with respect to the point of intersection between the exit surface 4 and the optical axis 10.

In the example shown in FIG. 1, the exit surface 4 is a convex surface, and the center of curvature of the exit surface 4 is located on the side of the light source 1 with respect to the point of intersection between the exit surface 4 and the optical axis 10. Accordingly, the sign of the curvature radius $R_{h2}$ is positive. If the exit surface 4 is a concave surface, the center of curvature of the exit surface 4 is located on the side opposite to the light source 1, and accordingly, the sign of the curvature radius $R_{h2}$ is negative.

As for the light beam 30b in the direction of generatrix of the lens 2, the focal length f in the direction of generatrix and a focal length $FFL_v$ on the front (the side of the light source 1) are represented by Expression (4) shown below.

$$f = \frac{R_{v1}R_{v2}}{(n-1)\left(R_{v1} - R_{v2} + \frac{n-1}{n}d\right)} = \quad (4)$$

$$\frac{1}{(n-1)\left(\frac{1}{R_{v2}} - \frac{1}{R_{v1}} + \frac{d}{R_{v1}R_{v2}}\frac{n-1}{n}\right)}$$

$$FFL_v = f - h1 = f\left(1 - \frac{n-1}{n}\frac{d}{R_{v2}}\right)$$

In Expression (4), h1 represents the principal point position on the side of the light source 1 in the direction of generatrix of the lens 2, and the sign is positive in the direction from the point of intersection between the incident surface 3 and the optical axis 10 toward the inside of the lens 2.

In a case where the curvature radius $R_{v2}=\infty$, Expression (4) is simplified, and is represented by following Expression (5).

$$f = -\frac{R_{v1}}{n-1} \quad (5)$$

$$FFL_v = f = \frac{R_{v1}}{n-1}$$

Accordingly, in the example shown in FIG. 1B, the focal length f in the direction of generatrix is the same as the front focal length $FFL_v$.

Next, operation of the parallel light generation device will be described with reference to FIG. 3.

Figure 3A:
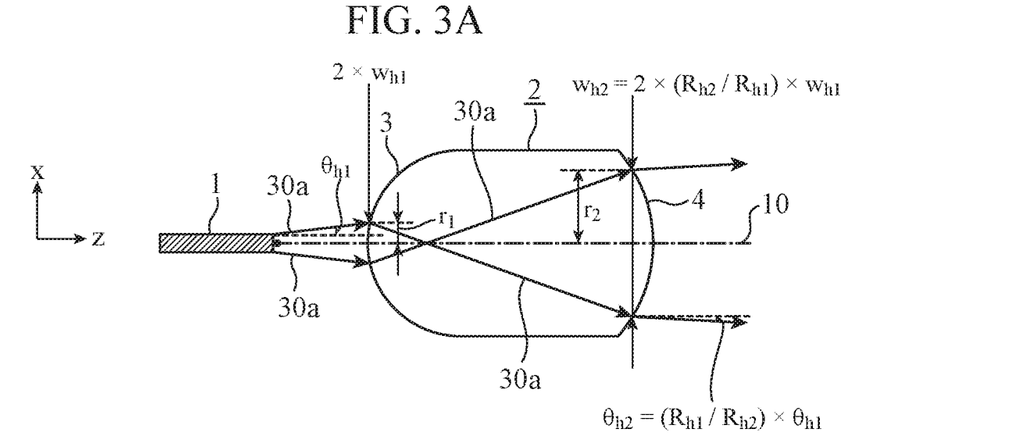
FIG. 3A is an explanatory diagram showing a light beam 30a in the direction of curvature of a lens 2.
Figure 3B:
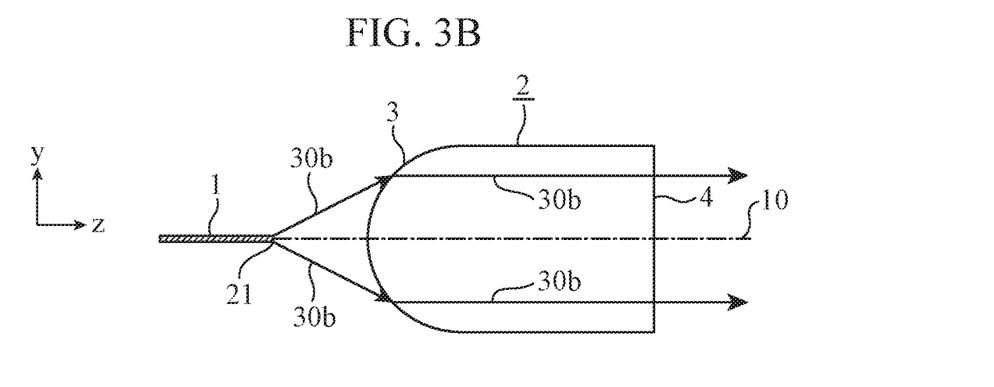
FIG. 3B is an explanatory diagram showing a light beam 30b in the direction of generatrix of the lens 2.

FIG. 3A is an explanatory diagram showing the light beam 30a in the direction of curvature of the lens 2. FIG. 3B is an explanatory diagram showing the light beam 30b in the direction of generatrix of the lens 2.

Light emitted from the light source 1 enters the incident surface 3 of the lens 2 while spreading, is propagated inside the lens 2 from the incident surface 3 to the exit surface 4, and exits from the exit surface 4.

Of the light emitted from the light source 1, the light beam 30a in the direction of curvature of the lens 2 and the light beam 30b in the direction of generatrix of the lens 2 are differently affected by the lens 2.

In the first embodiment, for ease of explanation, only the light beam 30a is considered with respect to the direction of curvature of the lens 2, and only the light beam 30b is considered with respect to the direction of generatrix of the lens 2.

The light beam 30a in the direction of curvature of the lens 2 is emitted virtually from the position 22 inside the light source 1, and is condensed and diverged by the convex surface having the curvature radius $R_{h1}$ on the incident surface 3, so that the beam diameter is made larger.

The light beam 30a whose beam diameter is made larger is emitted to the outside of the lens 2, after the divergence angle thereof is reduced by the convex surface having the curvature radius $R_{h2}$ on the exit surface 4.

In the description below, operation of the light beam 30a will be described with the use of the ray matrix. The ray matrix is disclosed in Non-Patent Literature 1 listed below, for example.

[Non-Patent Literature 1] Lasers, A. E. Siegman, University Science Books, Mill Valley The light beam 30a emitted from the light source 1 in the direction of curvature is propagated by the front focal length $FFL_v$ corresponding to the distance from the light source 1 to the incident surface 3 of the lens 2, and then enters the lens 2.

The operation of the lens 2 can be explained as the actions to which the light beam 30a is subjected which are caused by the respective optical components in the lens 2.

The light beam 30a is subjected to actions caused by respective optical components, the actions including an action applied by the incident surface 3 of the lens 2, an action applied inside the lens 2, and an action applied by the exit surface 4 of the lens 2.

The action applied by the incident surface 3 of the lens 2 is the action applied by a dielectric boundary surface whose curvature radius is $R_{h1}$ and whose refractive index is n.

The action applied inside the lens 2 is the action applied inside of a dielectric whose center thickness is d.

The action applied by the exit surface 4 of the lens 2 is the action applied by a dielectric boundary surface whose curvature radius is $R_{h2}$ and whose refractive index is n.

The light beam 30a in the direction of curvature represented by a column vector is subjected to an action which can be represented by a 2-by-2 matrix.

Expression (6) shown below represents the action to which the light beam 30a is subjected in the range from the emission from the light source 1 to the incident to the incident surface 3 of the lens 2.

Expression (7) shown below represents the action applied by the incident surface 3 of the lens 2.

Expression (8) shown below represents the action applied inside of the lens 2.

Expression (9) shown below represents the action applied by the exit surface 4 of the lens 2.

$$\begin{pmatrix} r' \\ \theta' \end{pmatrix} = \begin{pmatrix} 1 & FFL_v \\ 0 & 1 \end{pmatrix}\begin{pmatrix} r \\ \theta \end{pmatrix} \quad (6)$$

$$= \begin{pmatrix} 1 & -\frac{R_{v1}}{n-1} \\ 0 & 1 \end{pmatrix}\begin{pmatrix} r \\ \theta \end{pmatrix}$$

$$\begin{pmatrix} r' \\ \theta' \end{pmatrix} = \begin{pmatrix} 1 & 0 \\ \frac{n-1}{nR_{h1}} & \frac{1}{n} \end{pmatrix}\begin{pmatrix} r \\ \theta \end{pmatrix} \quad (7)$$

$$\begin{pmatrix} r' \\ \theta' \end{pmatrix} = \begin{pmatrix} 1 & d \\ 0 & 1 \end{pmatrix}\begin{pmatrix} r \\ \theta \end{pmatrix} \quad (8)$$

$$\begin{pmatrix} r' \\ \theta' \end{pmatrix} = \begin{pmatrix} 1 & 0 \\ -\frac{n-1}{R_{h2}} & n \end{pmatrix}\begin{pmatrix} r \\ \theta \end{pmatrix} \quad (9)$$

In Expressions (6) through (9), r represents the optical axis height of the light beam 30a entering the respective optical components. As shown in FIG. 3A, for the incident surface 3 as the optical component, $r=r_1$, for example. For the exit surface 4 as the optical component, $r=r_2$, for example.

The symbol θ represents the angle formed between the light beam 30a entering the respective optical elements and the optical axis 10. For the incident surface 3 as the optical component, $\theta = \theta_{h1}$, for example. For the exit surface 4 as the optical component, $\theta = \theta_{h2}$, for example.

The symbol r' represents the optical axis height of the light beam 30a subjected to an action by an optical component.

The symbol θ' is the angle formed between the light beam 30a subjected to an action by an optical component and the optical axis 10.

Hereinafter, the (1, 1) element of the 2-by-2 matrix representing the action of an optical component will be represented by A, the (1, 2) element thereof will be represented by B, the (2, 1) element thereof will be represented by C, and the (2, 2) element thereof will be represented by D.

For example, in the 2-by-2 matrix in Expression (7), A=1, B=0, C=(n−1)/nR$_{h1}$, and D=1/n.

The light beam 30a is subjected to actions caused by the respective optical components in the range from the entrance of the light beam 30a to the incident surface 3 of the lens 2 to the emission of the light beam 30a from the exit surface 4 of the lens 2, the actions being able to be represented by the product of the 2-by-2 matrices in Expressions (7) through (9), as represented by Expression (10) shown below.

$$\begin{pmatrix} r' \\ \theta' \end{pmatrix} = \begin{pmatrix} 1 & 0 \\ -\frac{n-1}{R_{h2}} & n \end{pmatrix} \begin{pmatrix} 1 & d \\ 0 & 1 \end{pmatrix} \begin{pmatrix} 1 & 0 \\ \frac{n-1}{nR_{h1}} & \frac{1}{n} \end{pmatrix} \begin{pmatrix} r \\ \theta \end{pmatrix} \quad (10)$$

$$= \begin{pmatrix} 1 + \frac{n-1}{n}\frac{d}{R_{h1}} & \frac{d}{n} \\ (n-1)\left(\frac{1}{R_{h1}} - \frac{1}{R_{h2}} - \frac{n-1}{n}\frac{d}{R_{h1}R_{h2}}\right) & 1 - \frac{n-1}{n}\frac{d}{R_{h2}} \end{pmatrix} \begin{pmatrix} r \\ \theta \end{pmatrix}$$

By substituting the relationship shown in Expression (3) into the 2-by-2 matrix in Expression (10) and rearranging it, the relationship represented by following Expression (11) is obtained.

$$\begin{pmatrix} r' \\ \theta' \end{pmatrix} = \begin{pmatrix} \frac{R_{h2}}{R_{h1}} & \frac{d}{n} \\ 0 & \frac{R_{h1}}{R_{h2}} \end{pmatrix} \begin{pmatrix} r \\ \theta \end{pmatrix} = \begin{pmatrix} \frac{R_{h2}}{R_{h1}}r + \frac{d}{n}\theta \\ \frac{R_{h1}}{R_{h2}}\theta \end{pmatrix} \quad (11)$$

In the case of an ideal enlargement system that satisfies Expression (3), the beam radius $w_{h1}$ of the light beam 30a in the direction of curvature on the incident surface 3 is multiplied by approximately Rh$_2$/Rh$_1$, as shown in Expression (11). Accordingly, the beam radius $w_{h2}$ of the light beam 30a in the direction of curvature on the exit surface 4 is approximately (Rh$_2$/Rh$_1$)×$w_{h1}$. Here, (d/n)×θ in Expression (11) is neglected.

Further, the divergence half angle $\theta_{h1}$ of the light beam 30a in the direction of curvature on the incident surface 3 is multiplied by Rh$_1$/Rh$_2$. Accordingly, the divergence half angle $\theta_{h2}$ of the light beam 30a in the direction of curvature on the exit surface 4 is (Rh$_1$/R$_{h2}$)×$\theta_{h1}$.

Thus, the divergence angle of the light beam 30a in the direction of curvature can be reduced on the basis of the ratio between the curvature radius R$_{h1}$ and the curvature radius R$_{h2}$.

Since the divergence angle of the light beam 30a in the direction of curvature can be reduced on the basis of the ratio between the curvature radius R$_{h1}$ and the curvature radius R$_{h2}$, the divergence angle of the light beam 30a in the direction of curvature can be determined independently of Expression (1). Thus, the divergence angle of the light beam 30a in the direction of curvature can be determined independently of the light-emission half width $w_h$ and the focal length f of the light source 1.

The light beam 30a is subjected to the actions caused by the respective optical components in the range from the emission from the light source 1 to the emission from the exit surface 4 of the lens 2, the actions being able to be represented by Expression (12) shown below.

In Expression (12), the actions to which the light beam 30a is subjected which are caused by the respective optical components are represented by the product of the 2-by-2 matrix in Expression (6) and the 2-by-2 matrix in Expression (11).

$$\begin{pmatrix} r' \\ \theta' \end{pmatrix} = \begin{pmatrix} \frac{R_{h2}}{R_{h1}} & \frac{d}{n} \\ 0 & \frac{R_{h1}}{R_{h2}} \end{pmatrix} \begin{pmatrix} 1 & FFLv \\ 0 & 1 \end{pmatrix} \begin{pmatrix} r \\ \theta \end{pmatrix} \quad (12)$$

$$= \begin{pmatrix} \frac{R_{h2}}{R_{h1}} & \frac{R_{h2}}{R_{h1}}FFLV + \frac{d}{n} \\ 0 & \frac{R_{h1}}{R_{h2}} \end{pmatrix} \begin{pmatrix} r \\ \theta \end{pmatrix}$$

$$= \begin{pmatrix} \frac{R_{h2}}{R_{h1}}(r + FFLv\theta) + \frac{d}{n}\theta \\ \frac{R_{h1}}{R_{h2}}\theta \end{pmatrix}$$

By comparing Expressions (11) and (12), it is shown that the beam diameter of the light beam 30a is increased from r to r+FFL$_v$×θ between the light source 1 and the incident surface 3 of the lens 2. However, it can be seen that there is no change in the beam diameter and the divergence angle of the light beam 30a, between the incident surface 3 and the exit surface 4 of the lens 2.

As is apparent from Expression (12), the divergence angle of the light beam 30a in the direction of curvature is independent of the focal length f and the front focal length FFL$_v$.

Accordingly, it is clear that the divergence angle of the light beam 30a in the direction of curvature does not depend on the distance between the light source 1 and the lens 2 in the optical axis direction.

The first embodiment has the advantage that the influence of the tilt of the light beam 30a due to the position deviation in the x direction between the light source 1 and the lens 2 as well as the influence of the position deviation in the optical axis direction between the light source 1 and the lens 2 is small.

In the description below, the advantage that the influence of the tilt of the light beam 30a due to the position deviation in the x direction between the light source 1 and the lens 2 is small will be described with the use of ray matrices in which position deviations are taken into consideration.

The light beam 30a is subjected to the actions caused by the respective optical components in the range from the entrance of the light beam 30a to the incident surface 3 of the lens 2 to the emission of the light beam 30a from the exit surface 4 of the lens 2, the actions being represented by Expression (13), which is modified from Expression (11), with taking the position deviation into consideration.

$$\begin{pmatrix} E \\ F \end{pmatrix} = \begin{pmatrix} 1-A & d-B \\ -C & 1-D \end{pmatrix} \begin{pmatrix} \Delta \\ \Delta' \end{pmatrix} \quad (13)$$

-continued $$\begin{pmatrix} r' \\ \theta' \\ 1 \end{pmatrix} = \begin{pmatrix} \frac{R_{h2}}{R_{h1}} & \frac{d}{n} & E \\ 0 & \frac{R_{h1}}{R_{h2}} & F \\ 0 & 0 & 1 \end{pmatrix} \begin{pmatrix} r \\ \theta \\ 1 \end{pmatrix}$$

$$= \begin{pmatrix} \frac{R_{h2}}{R_{h1}} & \frac{d}{n} & \left(1 - \frac{R_{h2}}{R_{h1}}\right)\Delta + \left(d - \frac{d}{n}\right)\Delta' \\ 0 & \frac{R_{h1}}{R_{h2}} & \left(1 - \frac{R_{h1}}{R_{h2}}\right)\Delta' \\ 0 & 0 & 1 \end{pmatrix} \begin{pmatrix} r \\ \theta \\ 1 \end{pmatrix}$$

In Expression (13), Δ represents the amount of the position deviation in the x direction between the light source 1 and the lens 2, and Δ′ represents the tilt of the lens 2 with respect to the light source 1.

Expression (13) can be rearranged into Expression (14) shown below, and it can be understood that the position deviation amount Δ does not affect the divergence angle of the light beam 30a in the direction of curvature.

$$r' = \frac{R_{h2}}{R_{h1}} r + \frac{d}{n}\theta + \left(1 - \frac{R_{h2}}{R_{h1}}\right)\Delta + \left(d - \frac{d}{n}\right)\Delta' \quad (14)$$

$$\theta' = \frac{R_{h1}}{R_{h2}}\theta + \left(1 - \frac{R_{h1}}{R_{h2}}\right)\Delta'$$

In the above, the light beam 30a in the direction of curvature of the lens 2 is described. In the description below, the light beam 30b in the direction of generatrix of the lens 2 will be described.

Since the end face of the light source 1 in the direction of generatrix of the lens 2 is disposed at the position at which the focal length on the side of the light source 1 becomes $FFL_v$, the light beam 30b in the direction of generatrix is collimated by the convex surface having the curvature radius $R_{v1}$ on the incident surface 3 and the flat surface of the exit surface 4.

In the description below, operation of the light beam 30b will be described with the use of ray matrices.

The light beam 30b emitted from the light source 1 in the direction of generatrix is propagated by the front focal length $FFL_v$ corresponding to the distance from the light source 1 to the incident surface 3 of the lens 2, and then enters the lens 2.

The operation of the lens 2 can be explained as the actions to which the light beam 30b is subjected which are caused by the respective optical components in the lens 2.

The light beam 30b is subjected to actions caused by the respective optical components, the actions including an action applied by the incident surface 3 of the lens 2, an action applied inside the lens 2, and an action applied by the exit surface 4 of the lens 2.

The action applied by the incident surface 3 of the lens 2 is the action applied by a dielectric boundary surface whose curvature radius is $R_{v1}$ and whose refractive index is n.

The action applied inside the lens 2 is the action applied inside of a dielectric whose center thickness is d.

The action applied by the exit surface 4 of the lens 2 is the action applied by a dielectric boundary surface whose curvature radius is $R_{v2}$ and whose refractive index is n.

An action to which the light beam 30b in the direction of generatrix represented by a column vector is subjected can be represented by a 2-by-2 matrix.

Expression (15) shown below represents the action applied by the incident surface 3 of the lens 2.

Expression (16) shown below represents the action applied inside of the lens 2.

Expression (17) shown below represents the action applied by the exit surface 4 of the lens 2.

The action to which the light beam 30b in the direction of generatrix is subjected from the time when the light beam 30b is emitted from the light source 1 until the time when the light beam 30b enters the incident surface 3 of the lens 2 is represented by Expression (6), as in the case of the light beam 30a in the direction of curvature.

$$\begin{pmatrix} r' \\ \theta' \end{pmatrix} = \begin{pmatrix} 1 & 0 \\ \frac{n-1}{nR_{v1}} & \frac{1}{n} \end{pmatrix} \begin{pmatrix} r \\ \theta \end{pmatrix} \quad (15)$$

$$\begin{pmatrix} r' \\ \theta' \end{pmatrix} = \begin{pmatrix} 1 & d \\ 0 & 1 \end{pmatrix} \begin{pmatrix} r \\ \theta \end{pmatrix} \quad (16)$$

$$\begin{pmatrix} r' \\ \theta' \end{pmatrix} = \begin{pmatrix} 1 & 0 \\ -\frac{n-1}{R_{v2}} & n \end{pmatrix} \begin{pmatrix} r \\ \theta \end{pmatrix} \quad (17)$$

The light beam 30b is subjected to actions caused by the respective optical components in the range from the entrance of the light beam 30b to the incident surface 3 of the lens 2 to the emission of the light beam 30b from the exit surface 4 of the lens 2, the actions being able to be represented by the product of the 2-by-2 matrices in Expressions (15) through (17), as represented by Expression (18) shown below.

$$\begin{pmatrix} r' \\ \theta' \end{pmatrix} = \begin{pmatrix} 1 & 0 \\ -\frac{n-1}{R_{v2}} & n \end{pmatrix} \begin{pmatrix} 1 & d \\ 0 & 1 \end{pmatrix} \begin{pmatrix} 1 & 0 \\ \frac{n-1}{nR_{v1}} & \frac{1}{n} \end{pmatrix} \begin{pmatrix} r \\ \theta \end{pmatrix} \quad (18)$$

$$= \begin{pmatrix} 1 + \frac{n-1}{n}\frac{d}{R_{v1}} & \frac{d}{n} \\ (n-1)\left(\frac{1}{R_{v1}} - \frac{1}{R_{v2}} - \frac{n-1}{n}\frac{d}{R_{v1}R_{v2}}\right) & 1 - \frac{n-1}{n}\frac{d}{R_{v2}} \end{pmatrix} \begin{pmatrix} r \\ \theta \end{pmatrix}$$

Where the curvature radius $R_{v2}=\infty$, Expression (18) can be rearranged into Expression (19) shown below.

$$\begin{pmatrix} r' \\ \theta' \end{pmatrix} = \begin{pmatrix} 1 + \frac{n-1}{n}\frac{d}{R_{v1}} & \frac{d}{n} \\ \frac{n-1}{R_{v1}} & 1 \end{pmatrix} \begin{pmatrix} r \\ \theta \end{pmatrix} \quad (19)$$

The principal point position hi on the side of the light source 1 is (D−1)/C of Expression (19), and the front focal length $FFL_v$ is (D−2)/C of Expression (19).

The front focal length $FFL_v$ is the same as the front focal length $FFL_v$ shown in Expression (5).

The actions to which the light beam 30b is subjected which are caused by the respective optical components in the range from the emission from the light source 1 to the emission from the exit surface 4 of the lens 2 can be represented by Expression (20) shown below.

In Expression (20), the actions to which the light beam 30b is subjected which are caused by the respective optical components is represented by the product of the 2-by-2 matrix in Expression (6) and the 2-by-2 matrix in Expression (19).

$$\begin{pmatrix} r' \\ \theta' \end{pmatrix} = \begin{pmatrix} 1 + \frac{n-1}{n}\frac{d}{R_{v1}} & \frac{d}{n} \\ \frac{n-1}{R_{v1}} & 1 \end{pmatrix} \begin{pmatrix} 1 & FFLv \\ 0 & 1 \end{pmatrix} \begin{pmatrix} r \\ \theta \end{pmatrix} \quad (20)$$

$$= \begin{pmatrix} 1 + \frac{n-1}{n}\frac{d}{R_{v1}} & FFLv \\ \frac{n-1}{R_{v1}} & 0 \end{pmatrix} \begin{pmatrix} r \\ \theta \end{pmatrix}$$

$$= \begin{pmatrix} \left(1 + \frac{n-1}{n}\frac{d}{R_{v1}}\right)r + FFL_v\theta \\ -\frac{n-1}{R_{v1}}r \end{pmatrix}$$

As is apparent from Expression (20), the light beam 30b in the direction of generatrix emitted from the light source 1 becomes parallel light after being emitted from the exit surface 12.

As the light beam 30a in the direction of curvature of the lens 2 and the light beam 30b in the direction of generatrix of the lens 2 are subjected to actions as described above, the user can determine the focal length f and the front focal length $FFL_v$ in the direction of generatrix, in accordance with the required value of the divergence angle in the direction of generatrix.

Determining the focal length f in the direction of generatrix is equivalent to determining the curvature radius $R_{v1}$ of the incident surface 3 in the direction of generatrix and the refractive index n of the lens 2, as shown in Expression (5). In the first embodiment, $R_{h1}=R_{v1}$, and therefore, determining the curvature radius $R_{v1}$ of the incident surface 3 in the direction of generatrix is equivalent to determining the curvature radius $R_{h1}$ of the incident surface 3 in the direction of curvature.

The user can also determine the curvature radius $R_{h2}$ and the thickness d of the exit surface 4 in the direction of curvature in accordance with the required value of the divergence angle in the direction of curvature.

In the description below, specific examples of the light source 1 and the lens 2 will be disclosed, and effects of the parallel light generation device according to the first embodiment will be described.

First, a parallel light generation device that uses a semiconductor laser of 808 nm in wavelength as the light source 1, and collimates light with an axisymmetric planoconvex lens, instead of the lens 2, is described as a comparative example to be compared with the parallel light generation device according to the first embodiment.

In this comparative example, it is assumed that the divergence half angle in the x-z plane is 8.5°, the divergence half angle in the y-z plane is 25.5°, the light emission width in the x direction is 200 μm, and the light emission width in the y direction is 1 μm. Further, it is assumed that the divergence half angle in the x-z plane and the divergence half angle in the y-z plane after collimation by the planoconvex lens are both within 1°.

Figure 4:
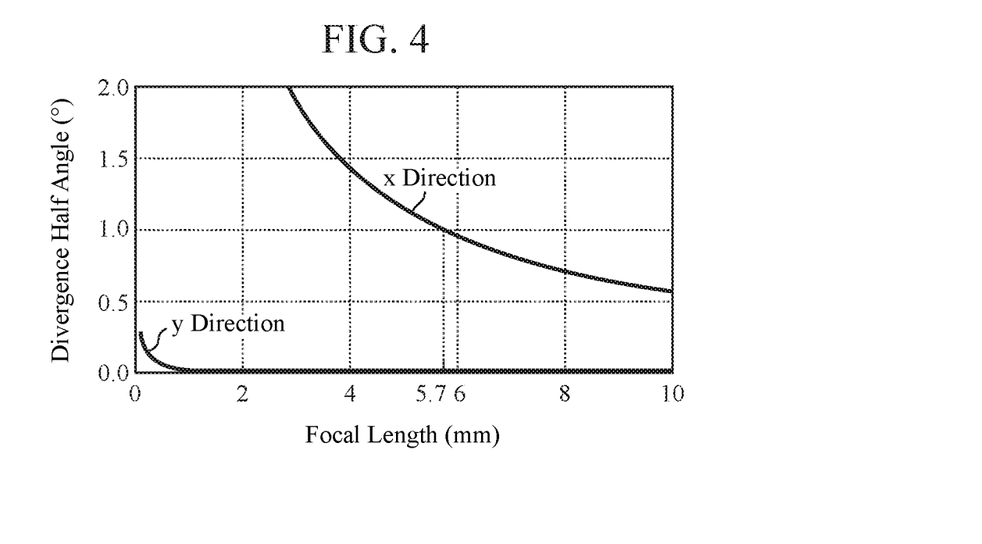
FIG. 4 is an explanatory diagram showing the relational expression between the focal length, and the divergence half angle $\theta_{ho}$ in the x-z plane and the divergence half angle $\theta_{vo}$ in the y-z plane after collimation by a planoconvex lens.

FIG. 4 is an explanatory diagram showing the relational expression between the focal length, and the divergence half angle $\theta_{ho}$ in the x-z plane and the divergence half angle $\theta_{vo}$ in the y-z plane after collimation by the planoconvex lens.

Figure 5:
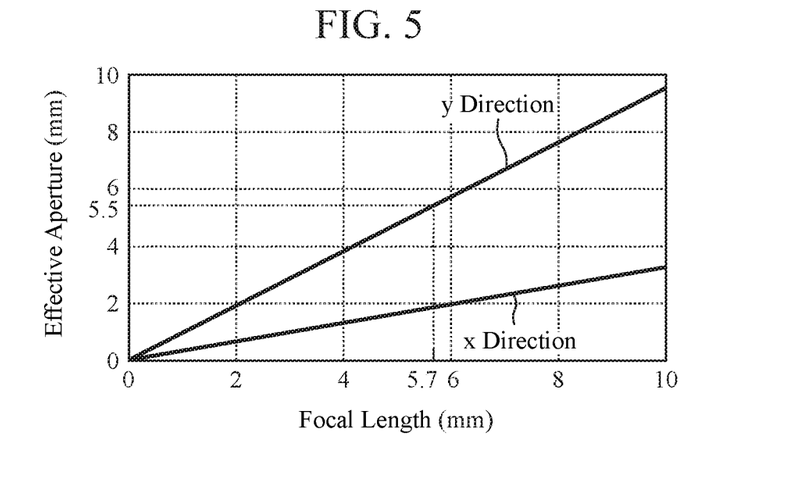
FIG. 5 is an explanatory diagram showing the relational expression between the focal length, and the effective aperture in the x direction and the effective aperture in the y direction in a planoconvex lens.

FIG. 5 is an explanatory diagram showing the relational expression between the focal length, and the effective aperture in the x direction and the effective aperture in the y direction in the planoconvex lens.

According to Expression (1) and Expression (2), a planoconvex lens with a focal length of 5.7 mm is required to realize 1° as the divergence half angle in the x-z plane after collimation, as shown in FIG. 4. In a case where the focal length is 5.7 mm, a planoconvex lens having an effective aperture of 5.5 mm in the y direction is required, as shown in FIG. 5.

Next, it is assumed that the parallel light generation device according to the first embodiment uses a semiconductor laser of 808 nm in wavelength as the light source 1, like the parallel light generation device of the comparative example.

Further, it is assumed that the lens 2 whose curvature radius $R_{h1}$ in the x-z plane and the curvature radius $R_{v1}$ in the y-z plane on the incident surface 3 are both −0.2 mm, the curvature radius $R_{h2}$ in the x-z plane on the exit surface 4 is 1.7 mm, and the curvature radius $R_{v2}$ in the y-z plane on the exit surface 4 is ∞ is used.

Moreover, it is assumed that the lens 2 having a center thickness d of 4.3 mm and a refractive index n of 1.8 is used.

In this case, each of the focal length f and the front focal length $FFL_v$ in the direction of generatrix, which is the y direction, is 0.25 mm, and the effective aperture of the lens 2 in the y direction is 0.24 mm. Further, the effective aperture of the lens 2 in the x direction is 0.27 mm on the incident surface side, and is 2.3 mm on the exit surface side. The details of the calculation of the effective aperture is not described herein.

Accordingly, in the parallel light generation device according to the first embodiment, compared with the parallel light generation device of the comparative example, it is possible to make the focal length f in the direction of generatrix, which is the y direction, be shorter, and the effective aperture be smaller, when realizing the same divergence half angle of 1°. Thus, the parallel light generation device according to the first embodiment can be made smaller in size, compared with the parallel light generation device of the comparative example.

In the first embodiment, the light emission width in the direction of curvature, which is the x direction, is greater than the light emission width in the direction of generatrix, which is the y direction. Therefore, the effective aperture of the lens 2 is determined from the beam diameter in the direction of curvature. The above curvature radii $R_{h1}$ and $R_{v1}$ on the incident surface 3, and the above curvature radii $R_{h2}$ and $R_{v2}$ on the exit surface 4 are merely examples, and may have some other values. It is possible to achieve an even smaller size by further decreasing the focal length f in the direction of generatrix.

Further, advantages (1) and (2) of the parallel light generation device according to the first embodiment will be described below.

(1) There is the advantage that a divergence angle increase due to an astigmatic difference does not occur.

In a case where an axisymmetric lens 2 is used, if the focal position 21 of the lens 2 is matched with the end face of the semiconductor laser, which is the light source 1, a focus shift occurs in the direction of curvature, which is the x direction, and the divergence angle becomes larger.

There is a technique for correcting an astigmatic difference in which, by using a lens 2 having different focal lengths in the direction of curvature and in the direction of generatrix, the focal position in the direction of curvature is matched with the position 22 inside the semiconductor laser, and the focal position 21 in the direction of generatrix is matched with the end face of the semiconductor laser. However, the position 22, which is the position of the virtual point of light emission in the direction of curvature of the semiconductor laser, involves variations, and changes depending on the output of the semiconductor laser. Since there are a plurality of factors that changes the position 22 of the virtual point of light emission in the direction of curvature, it is difficult to suppress the increase in the divergence angle due to an astigmatic difference.

In the parallel light generation device according to the first embodiment, the divergence angle in the direction of curvature does not depend on the front focal length $FFL_v$ between the light source 1 and the lens 2, as described above. For this reason, by disposing the end face of the light source 1 at the focal position 21 in the direction of generatrix, increase in the divergence angle in the direction of curvature is advantageously prevented, even if there is an astigmatic difference, and there is positional variations or dependence on the output of the semiconductor laser.

(2) There is the advantage that the positioning accuracy between the light source 1 and the lens 2 in the direction of curvature can be lowered.

In a case where a conventional collimation method is used, when a position deviation appears in the direction of curvature or the direction of generatrix, the light beam emission direction tilts with respect to the ideal emission direction, as can be seen from Expression (20).

To reduce the tilt of a light beam, high accuracy is required for the positioning of the lens 2 with respect to the light source 1. For example, a positioning accuracy of about a few μm to a few tens of μm is required.

Here, the positioning accuracy of the light emitting point with respect to the chip external shape of the semiconductor laser is high in the direction of generatrix, but is low in the direction of curvature. This is because, while strict thickness control is performed on the external shape in the direction of generatrix, the external shape in the direction of curvature depends on the accuracy in cutting a wafer into chips, and the cutting accuracy in the direction of curvature is a few μm to a few tens of μm, for example.

Therefore, the position of the light emitting point in the direction of curvature involves variations with respect to the external shape of a chip. Thus, for example, even in a case where a chip and a lens are assembled with high accuracy on the basis of the external shape, the relative positions of the light emitting point and the lens 2 in the direction of curvature involve variations.

In the first embodiment, even if a position deviation appears in the direction of curvature due to variation of the chip cutting position, the influence on the tilt of the light beam emission direction is small, and thus, it is possible to relax the requirement of the positioning accuracy in the direction of curvature between the light source 1 and the lens 2.

In the first embodiment described above, in a plane perpendicular to the optical axis 10 of the lens 2, the direction in which the cylindrical surface has zero curvature is the direction of generatrix of the lens 2, and the direction in which the cylindrical surface has non-zero curvature and that is orthogonal to the direction of generatrix is the direction of curvature of the lens 2. Further, the light source 1 is disposed at the focal position 21 in the direction of generatrix on the side of the incident surface 3 of the lens 2, and is designed to emit light toward the incident surface 3 of the lens 2, the light having a difference between the divergence angle in the direction of generatrix of the lens 2 and the divergence angle in the direction of curvature of the lens 2. Accordingly, it is possible to obtain a parallel light generation device in which it is not required to use a lens 2 that has a larger focal length and has a larger effective aperture to achieve a smaller divergence angle.

In the first embodiment, an example in which a semiconductor laser is used as the light source 1 is described. However, a laser of a different type from a semiconductor laser or a light source other than a laser may be used as the light source 1.

In the first embodiment, an example in which the emission point in the direction of generatrix is an end face of the light source 1 is described. However, the emission point in the direction of generatrix is not necessarily an end face of the light source 1, as long as the focal position 21 of the lens 2 is optically located at a position that can be optically regarded as the emission point in the direction of generatrix.

For example, to prevent the end face of the light source 1 from deteriorating, a structure generally called a window is formed in the vicinity of the end face in some cases. In a case where the optical emission point in the direction of generatrix is located inside the light source 1 due to the influence of this window, for example, the lens 2 is positioned in conformity with the emission point inside.

In such a case, even if the emission point in the direction of curvature is formed at the position 22 inside the light source 1 which is different from the emission point in the direction of generatrix due to an astigmatic difference, no focus shift occurs in the first embodiment.

In the first embodiment, an example in which the incident surface 3 of the lens 2 is a convex surface that is axially symmetrical about the optical axis 10 is described. However, the incident surface 3 of the lens 2 is not necessarily a convex surface that is axially symmetrical about the optical axis 10. As is apparent from Expressions (4) through (20), there is no need to maintain $Rh_1 = Rv_1$.

In other words, since Expression (12) is represented using $Rh_1$, and Expression (20) is represented using $Rv_1$, Expressions (12) and (20) can be used without any change even a case where $R_{h1} \neq Rv_1$, so that there is no need to maintain $Rh_1 = Rv_1$.

In the first embodiment, the example in which the incident surface 3 of the lens 2 is a convex surface that is axially symmetrical about the optical axis 10 is described because the lens 2 is expected to be produced more easily than a convex surface that is not axially symmetrical about the optical axis 10.

By forming the incident surface 3 of the lens 2 to be a toroidal surface having different curvature radii in the direction of curvature and the direction of generatrix, a higher degree of freedom in design for correcting aberrations with higher precision is achieved.

In the first embodiment, an example in which the exit surface 4 of the lens 2 is a cylindrical surface while the exit surface 4 in the direction of curvature is a convex surface is described. However, the surface in the direction of curvature may be a spherical surface or an aspherical surface. As the surface in the direction of curvature is an aspherical surface, it is expected that aberrations occurring in the optical system can be corrected with higher precision.

The operation in the direction of curvature according to the first embodiment is equivalent to collimating a light source image with the dielectric boundary surface serving as the exit surface 4, the light source image being formed at the focal position on the dielectric boundary surface serving as the incident surface 3. This operation in the direction of curvature differs from an operation performed by a collimating lens including a conventional asymmetrical one to collimate a light source image with the dielectric boundary surface serving as the exit surface, the light source image being formed at the imaging position of the light source on the dielectric boundary surface serving as the incident surface.

Therefore, it is clear that the effects of the first embodiment can be achieved, even if Expression (3) is not strictly satisfied. Note that, the effects of the first embodiment are achieved in a case where the focal position on the dielectric boundary surface serving as the exit surface 4 is located in a region closer to the focal plane on the dielectric boundary surface serving as the incident surface 3, than the imaging position of the light source 1 on the dielectric boundary surface serving as the incident surface 3.

In the first embodiment, an example in which the surface in the direction of generatrix is a flat surface of the exit surface 4 of the lens 2 is described. However, the surface in the direction of generatrix is not necessarily a completely flat surface, and may be a concave surface or a convex surface. The same effects as above can be achieved, even if the surface in the direction of generatrix is a concave surface or a convex surface.

For example, in a case where the surface in the direction of generatrix is a convex surface, the amount of refraction can be shared between the incident surface 3 and the exit surface 4. Thus, it is expected that aberrations can be further reduced. In a case where the surface in the direction of generatrix is a flat surface, it is expected that the lens 2 is produced more easily than in a case with a concave surface or a convex surface. Therefore, in the first embodiment, the surface being a flat surface in the direction of generatrix is described.

In the first embodiment, an example in which the material of the lens 2 is glass is described. However, the material of the lens 2 is not necessarily glass, and may be plastic or crystal, for example.

To temporarily collect light beams inside the lens 2, the material of the lens 2 may be selected so as to cause a phenomenon that occurs nonlinearly with light intensity, such as generation of second harmonic waves, for example.

In the first embodiment, an example in which the distance between the light source 1 and the lens 2 is equal to the front focal length $FFL_v$ is described. However, the distance between the light source 1 and the lens 2 may not be exactly the same as the front focal length $FFL_v$. It is apparent that, as long as the divergence angle in the direction of generatrix emitted from the lens 2 falls within a required value range, there will be no problem even if the distance between the light source 1 and the lens 2 differs from the front focal length $FFL_v$.

For example, the divergence angle in the direction of curvature emitted from the lens 2 is $(Rh_1/Rh_2) \times \theta_{h1}$, which is derived from Expression (12).

Further, the divergence angle in the direction of generatrix emitted from the lens 2 in a case where the distance between the light source 1 and the lens 2 differs from the front focal length $FFL_v$ is $(\Delta/f) \times \theta_{v1}$, which is derived from Expression (20). Here, $\Delta$ represents the amount of the position deviation, and it is possible to obtain this divergence angle by replacing $FFL_v$ in Expression (20) with $FFL_v + \Delta$.

Accordingly, in a case where the divergence angle in the direction of curvature and the divergence angle in the direction of generatrix are the same, Expression (21) shown below is established.

$$\frac{R_{h1}}{R_{h2}} \times \theta_{h1} = \frac{\Delta}{f} \times \theta_{v1} \qquad (21)$$

In this expression, $(Rh_1/R_{h2}) \times \theta_{h1}$, which is the left side of Expression (21), and $(\Delta/f) \times \theta_{v1}$, which is the right side of Expression (21), are values requested by the user.

Therefore, as long as the divergence angle in the direction of generatrix emitted from the lens 2 is within the range of the required value $(=(\Delta/f) \times \theta_{v1})$, and the position deviation amount $\Delta$ satisfies Expression (21), there will be no problem even if the distance between the light source 1 and the lens 2 differs from the front focal length $FFL_v$.

The focal length f and the divergence half angle $\theta_{v1}$ of light emitted in the direction of generatrix from the light source 1 in the right side of Expression (21) are also given values as design values accompanying the values requested by the user. Accordingly, it is easy to determine whether the actual position deviation amount $\Delta$ is a position deviation amount $\Delta$ that satisfies Expression (21).

Second Embodiment

In the example described in the first embodiment, the parallel light generation device includes the light source 1 that emits light to the lens 2.

In a second embodiment, an example in which a parallel light generation device includes a light source 40 having a plurality of light emitting points along the direction of curvature is described.

Figure 6A:
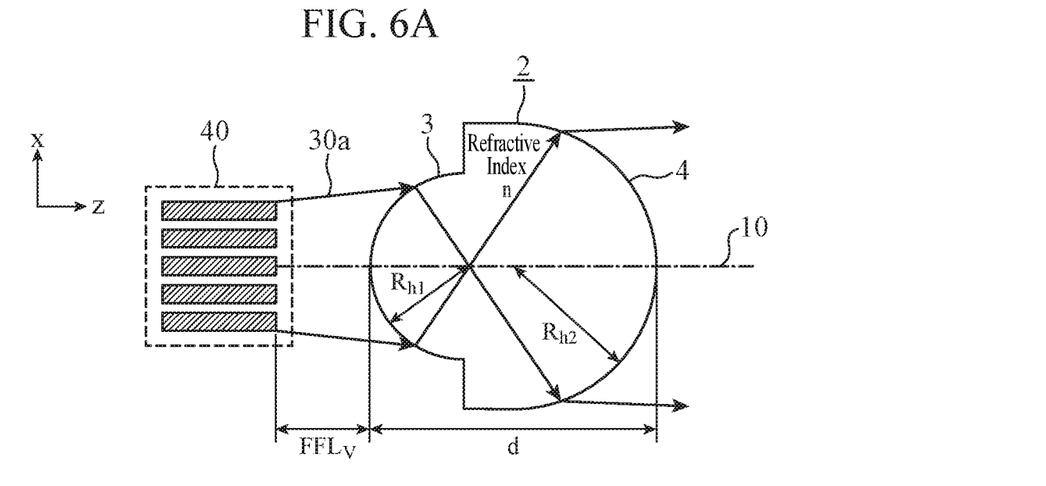
FIG. 6A is a plan view of a parallel light generation device according to a second embodiment.
Figure 6B:
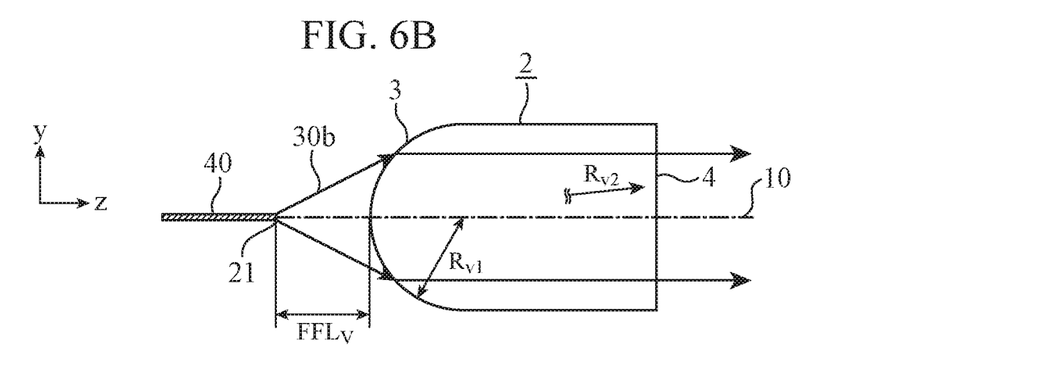
FIG. 6B is a side view of the parallel light generation device according to the second embodiment.

FIG. 6 shows configuration diagrams showing the parallel light generation device according to the second embodiment.

FIG. 6A is a plan view of the parallel light generation device according to the second embodiment. FIG. 6B is a side view of the parallel light generation device according to the second embodiment.

In FIG. 6, the same reference numerals as those in FIG. 1 denote the same or corresponding components, and therefore, explanation of them is not made herein.

The light source 40 is formed with a semiconductor laser array, for example, and has a plurality of light emitting points in the direction of curvature.

Like the position of the end face of the light source 1 in the first embodiment, the position of the end face of the light source 40 coincides with the focal position 21 in the direction of generatrix on the side of the incident surface 3 of the lens 2.

Although the shape of the lens 2 in the direction of curvature shown in FIG. 6A is different from the shape of the lens 2 in the direction of curvature shown in FIG. 1A, the lens 2 shown in FIG. 6A and the lens 2 shown in FIG. 1A are the same in that the incident surface 3 is a convex surface that is axially symmetrical about the optical axis 10.

In the second embodiment, the shape of the lens 2 in the direction of curvature may be the same as the shape of the lens 2 in the direction of curvature shown in FIG. 1A.

The shape of the lens 2 in the direction of generatrix shown in FIG. 6B is the same as the shape of the lens 2 in the direction of generatrix shown in FIG. 1B.

Next, operation of the parallel light generation device is described.

Each light beam 30a in the direction of curvature emitted from the plurality of light emitting points in the light source 40 enters the lens 2 from the incident surface 3.

The beam diameter of each light beam 30a emitted from the plurality of light emitting points in the light source 40 is enlarged by the incident surface 3 having a curvature radius $R_{h1}$ and the exit surface 4 having a curvature radius $R_{h2}$ in the lens 2.

Since the position of the end face of the light source 40 coincides with the focal position 21 in the direction of generatrix on the side of the incident surface 3 of the lens 2, the light beam 30b in the direction of generatrix emitted from the light source 40 is collimated by the incident surface 3 having the curvature radius $R_{v1}$ and the flat surface of the exit surface 4 of the lens 2.

Accordingly, in the second embodiment, the beam diameter of each light beam 30a in the direction of curvature emitted from the light source 40 is enlarged by the incident surface 3 of the lens 2, and the divergence angle thereof is then made smaller by the exit surface 4 of the lens 2, as in the first embodiment. The light beam 30b in the direction of generatrix emitted from the light source 40 is converted into parallel light by the incident surface 3 and the exit surface 4 of the lens 2.

In the second embodiment, it is possible to obtain a parallel light generation device that does not need to use a lens 2 that has a larger focal length and has a larger effective aperture to reduce the divergence angle, as in the first embodiment.

Here, in a case where the lens simply collimates light emitted from the plurality of light emitting points of the light source 40, which is a semiconductor laser array, the beam pattern emitted from the lens forms an array, and is low in spatial uniformity.

In the second embodiment, however, the lens 2 has the incident surface 3, which is a convex surface axially symmetrical about the optical axis 10, and the exit surface 4, which is a cylindrical surface.

Further, in the second embodiment, the light source 40 and the lens 2 are arranged so that the cylindrical surface coincides with the direction of curvature of the lens 2 in the x direction of the light source 40, and the cylindrical surface coincides with the direction of generatrix of the lens 2 in the y direction of the light source 40.

Further, in the second embodiment, the light source 40 and the lens 2 are arranged so that the position of an end face of the light source 40 coincides with the focal position 21 in the direction of generatrix on the side of the incident surface 3 of the lens 2.

Accordingly, the respective light beams 30a in the direction of curvature emitted from the plurality of light emitting points of the light source 40 can overlap with one another while operating to reduce the divergence angle. As a result, a spatially uniform beam is output from the lens 2.

Further, in the second embodiment, the lens 2 has the incident surface 3, which is a convex surface axially symmetrical about the optical axis 10, and the exit surface 4, which is a cylindrical surface. Accordingly, in the direction of curvature, a conjugate position of the light source 40 exists in the rear of the exit surface, and a light source image is generated. This conjugate image is useful in evaluating the positional dependency of the light source 40 in the direction of curvature after the light source 40 and the lens 2 are assembled. For example, when the output of the light source drops, it is possible to directly observe which position of the array light source has a defect without addition of any optical system.

A spatially uniform beam is particularly useful when being used directly for illumination without use of any uniform optical system or the like. Further, the respective beams of light emitted from the plurality of light emitting points of the light source 40 are arranged so as to overlap with one another. Accordingly, it is possible to reduce the speckles, which are a problem in a case where a laser is used for illumination, without addition of any uniform optical system.

The astigmatic difference of the light source 40, which is a semiconductor laser array, is affected by the temperature distribution in the semiconductor laser.

Since the heat density of the semiconductor laser array differs between the center portion and an end portion, there is variation in the temperature distribution between the center portion and an end portion of the semiconductor laser array. The variation in the temperature distribution in the semiconductor laser causes the magnitude of the astigmatic difference to vary among the light emitting points.

In the second embodiment, however, even if there is variation in the astigmatic difference among the light emitting points, it is possible to suppress the increase in the divergence angle. Thus, each light beam emitted from the plurality of light emitting points can be converted into parallel light.

In the second embodiment, the positional interval of the light emitting points of the light source 40 in the direction of curvature is constant.

However, in a case where the positional interval of the light emitting points of the light source 40 in the direction of curvature varies, or where the light emission widths of the light emitting points in the direction of curvature are different from one another, it is possible to convert each light beam emitted from the plurality of light emitting points into parallel light, even if the lens shape does not have a complicated shape in conformity with the positional interval or the light emission widths.

Third Embodiment

In the example described in the second embodiment, the parallel light generation device includes the light source 40 having a plurality of light emitting points in the direction of curvature.

Figures 7A, 7B:
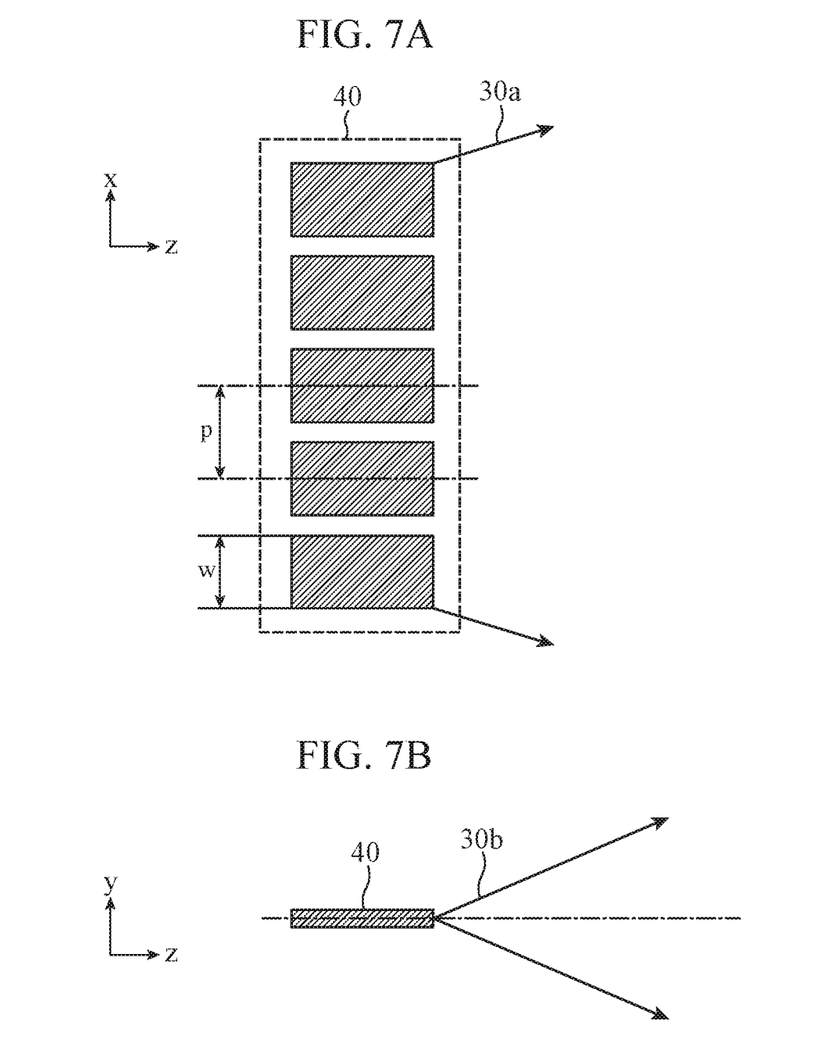
FIG. 7A is a plan view of a light source 40 of a parallel light generation device according to a third embodiment.
FIG. 7B is a side view of the light source 40 of the parallel light generation device according to the third embodiment.

In the example to be described in a third embodiment, a parallel light generation device includes a light source 40 whose fill factor F.F. determined from the respective light emission widths at a plurality of light emitting points and the positional interval of the light emitting points is equal to or higher than 0.5 and is lower than 1.

FIG. 7A is a plan view of the light source 40 of the parallel light generation device according to the third embodiment. FIG. 7B is a side view of the light source 40 of the parallel light generation device according to the third embodiment. In FIG. 7, the same reference numerals as those in FIG. 6 denote the same or corresponding components, and therefore, explanation of them is not made herein.

The fill factor F.F. of the light source 40 is defined by following Expression (22).

$$F.F. = \frac{w}{p} \quad (22)$$

In Expression (22), w represents the light emission width at each of the light emitting points, and p represents the positional interval of the light emitting points.

The parallel light generation device including the light source 40 having the plurality of light emitting points in the direction of curvature is particularly suitable in a case where the fill factor F.F. of the light source 40 is in the range of 0.5≤F.F.<1.

The configuration and operation of the parallel light generation device according to the third embodiment are the same as those of the parallel light generation device according to the second embodiment, and therefore, detailed description of them is not made herein.

First, a parallel light generation device that uses an array collimator lens, instead of the lens 2, is described as a comparative example to be compared with the parallel light generation device according to the third embodiment.

In the case described herein, each of the divergence angles of light beams emitted from the plurality of light emitting points of the light source 40 is made smaller with the array collimator lens formed with a lens axially symmetrical about the optical axis of each light emitting point.

The divergence half angle $\theta_{ho}$ of light emitted from the array collimator lens is ideally as in Expression (23) shown below.

$$\theta_{ho} = 2 \times \mathrm{Tan}^{-1}\left(\frac{\frac{w}{2}}{f}\right) \quad (23)$$

Where the focal length f is determined so that light beams emitted from the plurality of light emitting points of the light source 40 do not overlap with one another on the incident surface of the array collimator lens, the focal length f is as represented by following Expression (24).

$$f = \frac{p - w}{2 \times \mathrm{Tan}\left(\frac{\theta_{hi}}{2}\right)} \quad (24)$$

In Expression (24), $\theta_{hi}$ represents the divergence half angle of light in the direction of curvature, the light being emitted from a certain light emitting point of the light source 40.

By substituting Expressions (22) and (24) into Expression (23) and rearranging the expression, following Expression (25) is obtained.

$$\frac{\mathrm{Tan}\left(\frac{\theta_{ho}}{2}\right)}{\mathrm{Tan}\left(\frac{\theta_{hi}}{2}\right)} = \frac{F.F.}{1 - F.F.} \quad (25)$$

As can be seen from Expression (25), the divergence half angle $\theta_{hi}$ of light in the direction of curvature, the light being emitted from a certain light emitting point of the light source 40, and the divergence half angle $\theta_{ho}$ of light emitted from the array collimator lens are restricted by the fill factor F.F. of the light source 40.

For example, in a case where the fill factor F.F. of the light source 40 is 0.5, the right side of Expression (25) is 0.5×(1−0.5)=1. Since the right side of Expression (25) is 1, the divergence half angle $\theta_{hi}$ of the light entering the collimator lens is the same as the divergence half angle $\theta_{ho}$ of the light emitted from the collimator lens, and the divergence half angle of light is not made smaller by the collimator lens.

Further, in a case where the fill factor F.F. of the light source 40 is higher than 0.5 and lower than 1, the right side of Expression (25) is greater than 1. For example, in a case where the fill factor F.F. is 0.8, the right side of Expression (25) is 0.8×(1−0.8)=4.

Since the right side of Expression (26) is greater than 1, the divergence half angle $\theta_{ho}$ of the light emitted from the collimator lens is larger than the divergence half angle $\theta_{hi}$ of the light entering the collimator lens, and the divergence half angle $\theta_{ho}$ of light is not made smaller by the collimator lens.

On the other hand, in the parallel light generation device according to the third embodiment, the divergence half angle of light emitted from the lens 2 is determined, not depending on the front focal length $FFL_v$, as in the first and second embodiments.

Since the divergence half angle of light emitted from the lens 2 does not depend on the front focal length $FFL_v$, the divergence half angle of light emitted from the lens 2 is determined without depending on the fill factor F.F. of the light source 40.

Accordingly, the parallel light generation device according to the third embodiment can convert each light beam emitted from the plurality of light emitting points of the light source 40 into parallel light, regardless of the value of the fill factor F.F. of the light source 40.

In the parallel light generation device being a comparative example of the parallel light generation device according to the third embodiment, if the light source 40 having a fill factor F.F. in the range of 0.5≤F.F.<1 is used, the divergence half angle of light cannot be made smaller by the collimator lens. Therefore, the parallel light generation device of the comparative example cannot use the light source 40 having fill factor F.F. in the range of 0.5≤F.F.<1.

Considering that the parallel light generation device of the comparative example cannot use the light source 40 in the range of 0.5≤F.F.<1, the parallel light generation device according to the third embodiment is preferable particularly in a case where the light source 40 in the range of 0.5≤F.F.<1 is required to be used.

Fourth Embodiment

In each of the first through third embodiments, a parallel light generation device that includes a lens 2 whose incident surface 3 is a convex surface and whose exit surface 4 is a cylindrical surface is shown.

Figure 8A:
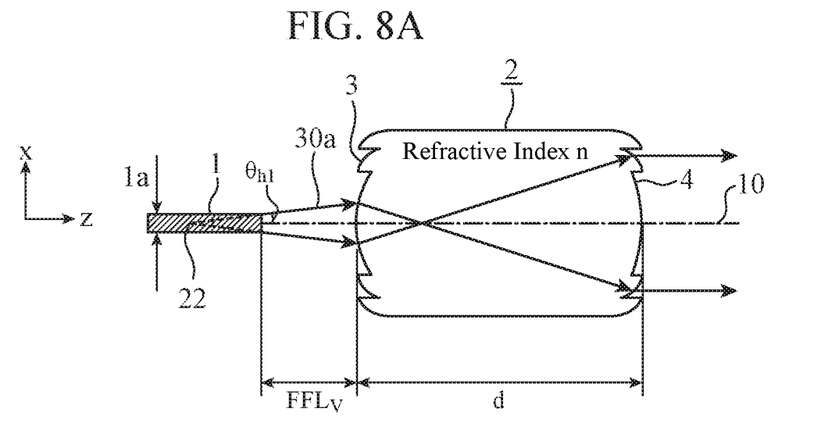
FIG. 8A is a plan view of a parallel light generation device according to a fourth embodiment.
Figure 8B:
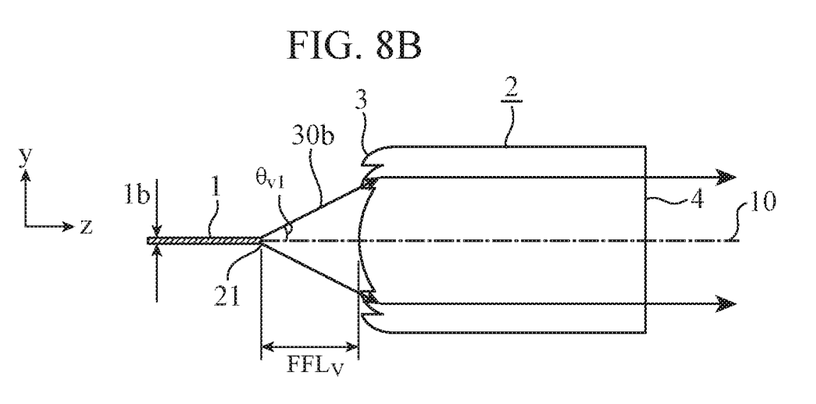
FIG. 8B is a side view of the parallel light generation device according to the fourth embodiment.

In the fourth embodiment, a parallel light generation device is described, which includes a lens 2 whose incident surface 3 that is a convex surface is a Fresnel lens as shown in FIGS. 8A and 8B, and whose exit surface 4 in the direction of curvature is a Fresnel lens as shown in FIG. 8A.

FIG. 8 shows configuration diagrams showing the parallel light generation device according to the fourth embodiment.

FIG. 8A is a plan view of the parallel light generation device according to the fourth embodiment. FIG. 8B is a side view of the parallel light generation device according to the fourth embodiment.

FIG. 8 shows an example in which the incident surface 3 and the exit surface 4 of the lens 2 of the parallel light generation device shown in FIG. 1 are Fresnel lenses. Alternatively, the incident surface 3 and the exit surface 4 of the lens 2 of the parallel light generation device shown in FIG. 6 may be Fresnel lenses.

Even if the incident surface 3 that is a convex surface is formed with a Fresnel lens, the Fresnel lens has the same effects as those of the incident surface 3 in the first through third embodiments on light emitted from the light source 1 or the light source 40.

Further, even if the convex surface of the exit surface 4 in the direction of curvature is formed with a Fresnel lens, the Fresnel lens has the same effects as those of the exit surface 4 in the first through third embodiments on light entered from the incident surface 3.

Accordingly, even if the incident surface 3 that is a convex surface is formed with a Fresnel lens, and the exit surface 4 in the direction of curvature is formed with a Fresnel lens, a parallel light generation device having the same effects as those of the first through third embodiments is obtained.

Further, as the incident surface 3 that is a convex surface is formed with a Fresnel lens, the thickness of the incident surface 3 can be made smaller than that in a case where the incident surface 3 is a convex surface.

Likewise, as the exit surface 4 in the direction of curvature is formed with a Fresnel lens, the thickness of the exit surface 4 can be made smaller than that in a case where the exit surface 4 is a convex surface.

Further, as the incident surface 3 or the exit surface 4 is formed with a Fresnel lens, it becomes possible to easily determine the rotation angle about the optical axis of the lens by observing the external appearance. Thus, the accuracy in assembling the light source and the lens can be increased.

Although FIG. 8 shows an example in which both the incident surface 3 and the exit surface 4 of the lens 2 are Fresnel lenses, only one of the incident surface 3 or the exit surface 4 of the lens 2 may be a Fresnel lens.

Note that, within the scope of the present invention, the embodiments may be freely combined, modifications may be made to any component of each embodiment, or any component may be omitted from each embodiment.

INDUSTRIAL APPLICABILITY

The present invention is suitable for a parallel light generation device including a lens that converts light entering from the incident surface into parallel light and emits the parallel light from the exit surface.

REFERENCE SIGNS LIST

1: Light source, 1*a*: Light emission width in the x direction, 1*b*: Light emission width in the y direction, 2: Lens, 3: Incident surface, 4: Exit surface, 10: Optical axis, 21: Focal position, 22: Position in the light source, 30*a*: Light beam in the direction of curvature, 30*b*: Light beam in the direction of generatrix, 40: Light source

The invention claimed is:

1. A parallel light generation device comprising:
a light source to emit light; and
a lens to convert light emitted from the light source and entered from an incident surface of the lens into parallel light and to emit the parallel light from an exit surface of the lens, the incident surface being a convex surface, the exit surface being a cylindrical surface,
wherein, in a plane perpendicular to an optical axis of the lens, a direction in which the cylindrical surface has zero curvature is a direction of generatrix of the lens, and a direction in which the cylindrical surface has non-zero curvature and that is orthogonal to the direction of generatrix is a direction of curvature of the lens, and
the light source is disposed at a focal position in the direction of generatrix on a side of the incident surface of the lens, and emits light toward the incident surface of the lens, the light having a difference between a divergence angle in the direction of generatrix of the lens and a divergence angle in the direction of curvature of the lens.

2. The parallel light generation device according to claim 1, wherein the light source has a greater light emission width in the direction of curvature than a light emission width in the direction of generatrix.

3. The parallel light generation device according to claim 1, wherein the light source has an astigmatic difference in which a virtual point of light emission in the direction of curvature of the lens is different from a point of light emission in the direction of generatrix of the lens.

4. The parallel light generation device according to claim 1, wherein a semiconductor laser is used as the light source.

5. The parallel light generation device according to claim 1, wherein the light source has a plurality of light emitting points along the direction of curvature.

6. The parallel light generation device according to claim 5, wherein a semiconductor laser array is used as the light source.

7. The parallel light generation device according to claim 5, wherein the light source has a fill factor that is equal to or greater than 0.5 and lower than 1, the fill factor being determined from a light emission width of each of the plurality of light emitting points and a positional interval among the plurality of light emitting points.

8. The parallel light generation device according to claim 1, wherein the incident surface of the lens is a convex surface that is axially symmetrical about the optical axis.

9. The parallel light generation device according to claim 1, wherein the incident surface of the lens is a Fresnel lens.

10. The parallel light generation device according to claim 1, wherein the exit surface of the lens in the direction of curvature is a Fresnel lens.

11. The parallel light generation device according to claim 1, wherein the incident surface of the lens is a Fresnel lens, and the exit surface of the lens in the direction of curvature is a Fresnel lens.

* * * * *